United States Patent [19]

Puskar

[11] 3,941,872

[45] Mar. 2, 1976

[54] METHOD FOR PRODUCING CALCINED CLAY PIGMENTS

[75] Inventor: Victor Puskar, Basking Ridge, N.J.

[73] Assignee: Engelhard Minerals & Chemicals Corporation, Edison, N.J.

[22] Filed: May 8, 1974

[21] Appl. No.: 468,189

[52] U.S. Cl............... 423/331; 106/67; 106/288 B; 423/111
[51] Int. Cl.²......................................... C01B 33/24
[58] Field of Search.... 423/111, 331; 106/67, 288 B

[56] References Cited
UNITED STATES PATENTS

| | | | |
|---|---|---|---|
| 1,768,545 | 7/1930 | Curtis | 106/67 |
| 2,688,558 | 9/1954 | Rankine | 106/67 |
| 2,877,125 | 3/1959 | Duplin | 106/67 |

Primary Examiner—Peter D. Rosenberg
Attorney, Agent, or Firm—Melvin C. Flint; Inez L. Moselle

[57] ABSTRACT

Naturally-occurring hydrated kaolin clay is calcined under a reducing atmosphere at a temperature of at least 1400°F., preferably in the range of about 1600°F. to 2100°F., and then the clay is calcined in an oxidizing atmosphere at a temperature of at least 1400°F., preferably in the range of about 1600°F. to 2100°F., to produce a calcined clay pigment product of desired brightness.

11 Claims, 1 Drawing Figure

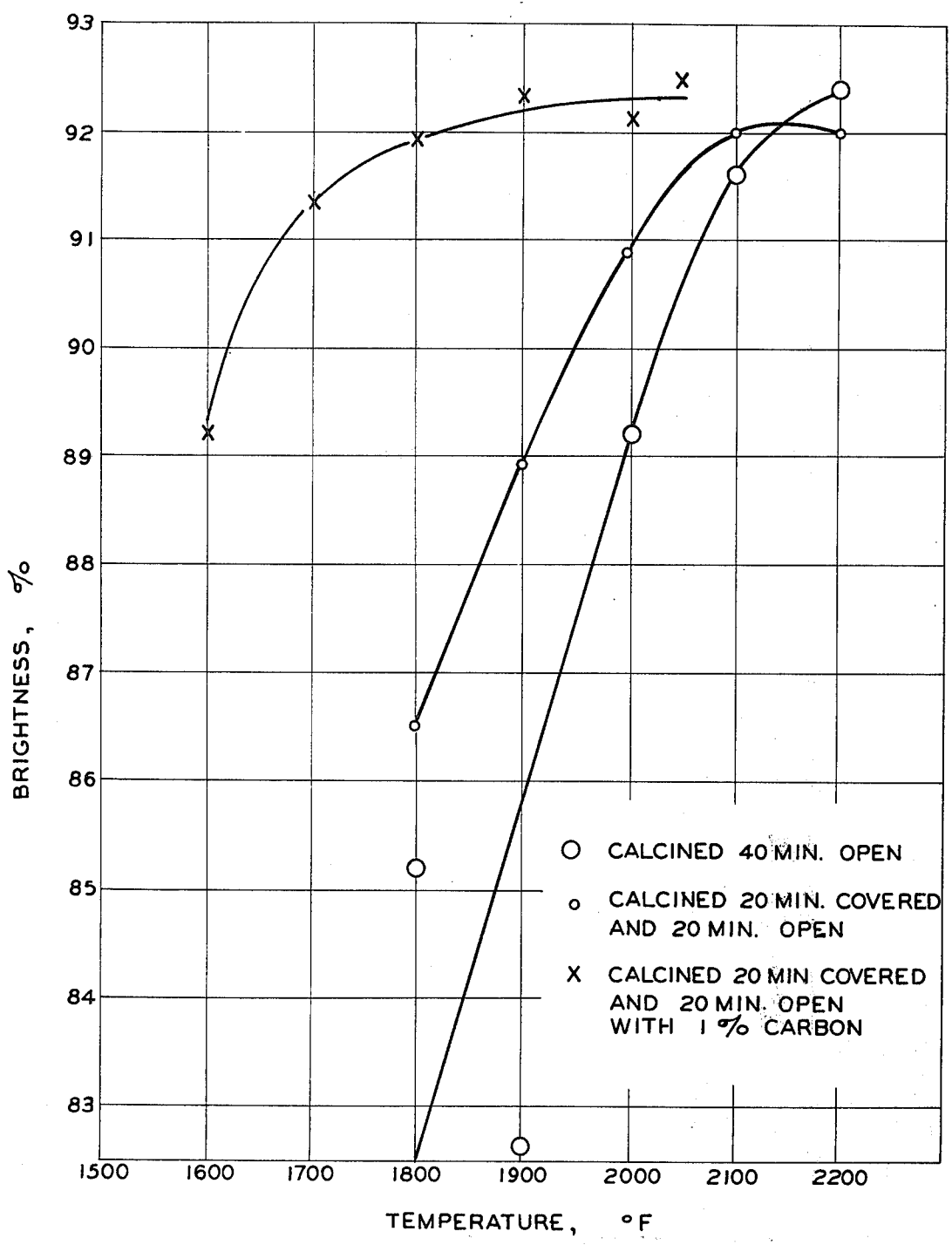

METHOD FOR PRODUCING CALCINED CLAY PIGMENTS

BACKGROUND OF THE INVENTION

1. Field of the Invention

This invention relates to the art of calcining finely divided naturally-occurring hydrated kaolin clay to produce a calcined clay pigment having a higher brightness than the starting clay and useful, for example, as a filler for paper or as a pigment for paper, plastics or paint.

Calcined kaolin clay is widely used by the paper and paint industries as a filler or pigment. Desirable properties of a calcined clay pigment or filler are high brightness and low abrasiveness. The principal demand is for calcined clay pigments having a brightness (as measured by the well-known TAPPI method) of at least 90 percent, preferably above, and an abrasiveness (as determined by the Valley method) below 100, preferably below 50.

The calcination treatment, which may be carried out in a rotary calciner with countercurrent flow of hot air or in a stationary furnace such as a muffle or Nichols Herreshoff furnace, is usually applied to a finely pulverized refined clay. During calcination, the kaolin undergoes a well-defined endothermic reaction associated with loss of water of crystallization when the clay temperature reaches about 1350°F. This results in an amorphous essentially anhydrous material usually referred to as "metakaolin." If the clay temperature is further increased, the metakaolin undergoes a characteristic exothermic reaction at about 1800°F. At temperatures above about 2200°F. new crystalline phases begin to form.

It is well known that the extent to which kaolin clay is brightened by calcination depends upon the calcination temperature. Thus, when a kaolin clay is calcined at temperatures in the range of about 1800°F. to 2100°F. the resulting product will be brighter than it would be if the same clay had been calcined at temperatures in the range of 1350°F. to 1650°F. for about the same period of time. However, all factors being constant, clay calcined at 1350°F. to 1650°F. will be less abrasive than the clay would be if calcined at a temperature in the range of about 1800°F. to 2100°F. At temperatures above about 2200°F. or 2300°F. the clay will be excessively abrasive unless the heating time is limited. Heating of kaolin clay at temperatures in the range of about 300°F. to 1100°F. usually darkens the clay. To the best of my knowledge, it is not fully understood why variations in calcination temperature have these effects on clay brightness.

The commercial production of very high brightness calcined clay pigments, e.g., pigments having brightness above 90 percent, usually involves calcining kaolin clay at temperatures of the order of 2000°F. Less bright and less abrasive pigments are produced at lower calcination temperatures, e.g., 1500°F.

Calcination adds appreciably to the cost of the clay. In view of the current energy shortage it would be desirable to produce very high brightness pigments at lower temperatures than those currently used. This would also provide the added benefit of reducing the abrasiveness obtained at any given calcination temperature. thus, it would be desirable to calcine a clay at a temperature of the order of 1600°F. to 1700°F. and produce a pigment that would be at least as bright (but less abrasive) than the pigment would be if it were calcined at a temperature of about 2000°F. with a greater consumption of fuel. Conversely, using temperatures in the range of about 1800°F. to 2100°F., it would be desirable to produce brighter pigments than those obtained at similar elevated temperatures utilizing presently known calcination technology.

2. Prior Art

The following patents describe prior art techniques for preparing calcined clay pigments and the like from naturally-occurring kaolin clay.

U.S. Pat. No. 2,256,528 to Rowe
U.S. Pat. No. 3,309,214 to Podschus et al
U.S. Pat. No. 3,014,836 to Proctor
U.S. Pat. No. 3,021,195 to Podschus et al
U.S. Pat. No. 3,383,438 to Allegrini et al Following are patents dealing with the recovery of clay from paper mill sludges by processing which includes one or more calcination steps.

U.S. Pat. No. 3,188,751 to Sutton
U.S. Pat. No. 3,765,921 to Puskar

It is well known that clay may be brightened by volatilizing from impurities as the chlorides at elevated temperature, optionally adding carbon to the clay before introducing chlorine gas or a source of chlorine. In this case, the carbon is added to facilitate the formation of a volatile iron chloride at a lower temperature.

THE INVENTION

I have discovered or invented a novel technique for calcining kaolin clay, involving simple modification of conventional procedures, which unexpectedly results in multiple possible benefits. By practice of my invention, a brighter clay product may be obtained at a given calcination temperature or clay of given brightness and lower abrasiveness may be produced at a lower calcination temperature.

The essence of my invention resides in sequential heated in a calciner treatment of kaolin clay wherein the clay is initially calcined under a reducing atmosphere to a temperature of at least 1400°F., preferably in the range of about 1600°F. to 2100°F., and the clay is subsequently heated in a calciner to the same or more elevated temperature (selected to produce a pigment of desired brightness) in the presence of air containing sufficient oxygen to constitute an oxidizing atmosphere.

In a presently preferred embodiment of the invention the reducing atmosphere is provided by heating the clay in the presence of carbon to a temperature of at least 1400°F. while limiting the amount of air in contact with the clay and carbon to provide a reducing atmosphere in contact with the clay during the calcination. In carrying out this embodiment of the invention, all or substantially all of the carbon may be present as an additive. Alternatively, at least a portion of the carbon may be an indigenous impurity in the clay. Domestic (Georgia) gray kaolin clay is an example of a carbon-contaminated clay which may be used without supplementary addition of carbon in the practice of the preferred embodiment of my invention.

One aspect of the instant invention entails the sequential calcination treatment, as briefly described, wherein all of the calcination is carried out under relatively low temperature, e.g., 1650°F. or below, with the production of a calcined pigment which is at least as bright but less abrasive than it would be carried out at more elevated temperature using conventional calcination techniques.

The other aspect of my invention, applicable to calcination at any temperature above the dehydration temperature but below sintering temperature, e.g., 1400°F. to 2200°F., results in a brighter calcined clay pigment for any given calcination temperature and time.

I have found that no benefits are derived from calcining the clay in the presence of carbon under reducing conditions at temperatures appreciably below 1400°F. The optimum temperature for exposing the clay to a reducing atmosphere is in the range of 1600°F. to 2100°F. Tests carried out with clays under varying contents of native iron mineral impurity ranging from about 0.3 percent to 1 percent (expressed as $Fe_2O_3$) indicate generally the benefits of the invention are increased as the content of the iron impurity is increased.

These observations, among others, have led to a possible explanation for the benefits obtained by calcining kaolin clay at a temperature of at least 1400°F. under a reducing atmosphere before calcining the clay under the conventional oxidizing atmosphere to a desired brightness value. As mentioned above, dehydroxylation of kaolin occurs when the clay is heated to a temperature of about 1350°F. At temperatures of 1400°F. and above, a substantial portion of the water of crystallization has been expelled from the clay. It is believed that in carrying out the invention iron in dehydrated kaolin (metakaolin) is reduced by the reducing atmosphere to form less intensely colored iron compounds. From the fact that the benefit of using the reducing atmosphere is not realized when the reducing atmosphere is employed at temperatures well below 1400°F., I conclude iron impurities in the clay are not reduced by heat treatment under a reducing atmosphere when the clay is in hydrated state or condition. I have observed that the subsequent calcination in conventional manner in an oxidizing atmosphere removes carbonaceous matter in the clay or added to the clay but otherwise has the usual effect on the clay. Thus, in practicing my invention the clay brightness and abrasiveness increase with increase in calcination temperature employed with the oxidizing atmosphere. However, for any calcination temperature up to about 2100°F. with the oxidizing atmosphere the calcined clay product will be brighter if it follows calcination under a reducing atmosphere at a temperature of at least 1400°F. It is believed that this occurs because the iron impurities reduced during the initial stage of calcination are not re-oxidized when the dehydrated clay is subsequently calcined under oxidizing conditions.

DETAILED DESCRIPTION

The initial calcination may be carried out by heating the clay to a temperature of at least 1400°F., preferably in the range of 1600°F. to 2100°F., while the clay is under an atmosphere of a reducing gas such as carbon monoxide. The subsequent calcination in the oxidizing atmosphere is carried out under conventional conditions, e.g., by calcining the clay in the presence of sufficient air to oxidize completely carbon monoxide. This may be accomplished simply by changing the composition of the gases in the calciner after the clay has been calcined under reducing conditions. By way of example, the clay may be calcined at 1650°F. (or other desired temperature) while it is under an atmosphere of carbon monoxide for 10 to 60 minutes and then an abundance of hot air may be substituted for the carbon monoxide while the bed of clay is maintained at the same temperature or different temperature for about 10 to 60 minutes.

Excellent results have been obtained utilizing kaolin clay containing a small amount of carbon and restricting the quantity of air in contact with the clay during initial calcination so that insufficient oxygen is present to burn completely the carbon or to oxidize fully carbon monoxide, thereby creating the required atmosphere while the clay is calcined at a temperature of at least 1400°F. The clay is subsequently calcined in the presence of sufficient air to establish the oxidizing atmosphere using a temperature and time selected, in conventional manner, to obtain a calcined clay pigment of desired brightness. For example, calcination under the oxidizing atmosphere may be conducted at a temperature in excess of about 2000°F. when a prime objective is to obtain a calcined pigment of maximum possible brightness. When a prime objective is to reduce the consumption of fuel and/or to produce a low abrasion pigment, calcination in air may be carried out at lower temperatures, e.g., in the range of 1450°F. to 1650°F.

In practicing the embodiment of the invention wherein clay containing carbon is calcined with restricted access of air during an initial stage of calcination, the clay should contain at least about 0.05 percent by weight carbon, preferably at least 0.1 percent carbon. Generally, best results are obtained when carbon is present in amount of at least 0.25 percent by weight. A preferred amount of carbon is within the range of 0.25 percent to 1 percent by weight. Thus, good results have been obtained with 4 percent to 5 percent carbon additives but these results were not significantly better than those obtained with 0.5 percent to 1 percent carbon.

As mentioned, the carbon may be indigenous to the clay or all or a portion of the carbon may be incorporated with the clay as an additive. Any carbon additive should preferably be low in material which would have a fluxing action. Suitable sources of added carbon are low ash charcoal, coke or coal. Finely divided or powdered sources of carbon may be employed or small lumps or granules may be utilized.

Prior to calcination, the kaolin will normally undergo preliminary refining treatment which will normally include wet degritting, particle size classification and recovery of a fine particle size fraction, drying and pulverization. Other processing steps such as mechanical delamination and chemical bleaching may be carried out before drying and pulverization. Typical preliminary refining procedures are described in the patents to Proctor and Allegrini (supra).

The following examples are given to illustrate features of the invention and to demonstrate benefits thereof. Brightness values reported in the examples are obtained by TAPPI procedure, using an Elrepho brightness meter. Abrasion was measured by the Valley method described in the patent to Proctor.

EXAMPLE I

This example illustrates the application of the process of the invention to the calcination of a fine size fraction of so-called "white kaolin clay." This clay is essentially devoid of carbonaceous impurities and contains a small amount of ferruginous impurity.

The starting clay was a commercial acid-grade paper coating pigment obtained by degritting and fractionating a typical soft Georgia kaolin, acid floccing and bleaching the fine size fraction and drying. Typical samples of the pigment contain (moisture-free weight basis) 45.4 percent $SiO_2$, 28.8 percent $Al_2O_3$; 0.3 percent iron (expressed as $Fe_2O_3$) and 13.8 percent Loss on Ignition (principally water of hydration). Brightness was about 86 percent. The clay was about 75 percent minus 2 microns; average particle size is 0.8 micron, equivalent spherical diameter.

To prepare the hydrated clay for calcination, it was pulverized in a Mikro Sample Mill through a 0.020 inch screen. A portion of the pulverized clay was blended with 0.5 percent by weight charcoal powder ("Nuchar"). The clays, with and without added carbon, were loosely packed in shallow silica trays, almost filling the trays. Some of the trays were closed to provide a reducing atmosphere. Others were left open to provide an oxidizing atmosphere. The trays were placed in an electrically heated muffle furnace maintained at a substantially constant temperature. Runs were made at four different temperature levels ranging from 1450°F. to 2050°F. for 40 minutes. During some of the runs, trays which were initially covered were uncovered after 20 minutes and calcination was continued for an additional 20 minutes.

After the calcined clay samples had cooled they were pulverized twice through the Mikro Sample Mill using a 0.02 inch screen.

Data in Table I for white clay calcined without added carbon for 40 minutes in open vessels (oxidizing atmosphere) simulating conventional practice, show that clay brightness increased as calcination temperature increased from 1450°F. to 2050°F. Data in the same table for runs in which a small amount of carbon was added and the initial stage of calcination was carried out in a closed container (reducing atmosphere), in accordance with the invention, show that at all calcination temperatures in the range of 1650°F. to 2050°F. the clay products were from 1 to 2 points higher in brightness than clay calcined at the same temperature and for the same time under conventional conditions.

The results are summarized in Table I.

TABLE I

EFFECT OF CALCINATION CONDITIONS ON CLAY BRIGHTNESS (WHITE KAOLIN CLAY)

| Carbon Added, Wt. % | Calcination Temp., °F. | Minutes Covered | Minutes Open | Brightness, % |
|---|---|---|---|---|
| 0 | 1450 | 0 | 40 | 86.3 |
| 0.5 | 1450 | 20 | 20 | 86.5 |
| 0 | 1650 | 0 | 40 | 88.4 |
| 0.5 | 1650 | 20 | 20 | 89.8 |
| 0 | 1850 | 0 | 40 | 91.5 |
| 0.5 | 1850 | 20 | 20 | 93.0 |
| 0 | 2050 | 0 | 40 | 91.8 |
| 0.5 | 2050 | 20 | 20 | 92.7 |

EXAMPLE II

This example demonstrates the embodiment of the invention wherein a native carbon impurity in a clay is utilized to obtain the benefits of the invention and to show how a greater benefit may be realized by mixing the clay with a small amount of additional carbon.

The clay used in this example was a fine size fraction of spray dried, wet processed hard gray Georgia kaolin clay. The clay, which contained about 0.8 percent iron, expressed as $Fe_2O_3$ and analyzed about .05 percent native carbon, is representative of a kaolin having a relatively high content of iron and carbon impurities.

The spray dried clay was pulverized in a fluid energy mill. To a portion of the milled clay, carbon ("Nuchar") was added in amount of 1 percent of the clay weight. Samples of the clay containing the added carbon were calcined in the muffle furnace for 20 minutes at various temperature levels (above and below dehydration conditions) under reducing conditions (closed vessels) or oxidizing conditions (open vessels). The clay was then calcined without an intermediate cooling step at 1850°F. for 20 minutes in open trays. The procedure was also carried out with a portion of the milled clay containing only native carbon impurity. A control test was carried out by calcining the portion of the clay to which carbon had not been added for 40 minutes in the muffle furnace at 1850°F. in an open container. All samples were pulverized after calcination, as in Example I. In other control tests, samples of the clay without added carbon were calcined at temperatures in the range of 750°F. to 1850°F. for 20 minutes under oxidizing conditions and then at 1850°F. for 20 minutes.

Results are summarized in Table II.

TABLE II

EFFECT OF TEMPERATURE ON CALCINING GRAY CLAY UNDER REDUCING CONDITIONS

| Carbon Added, % | Covered Tray Temp. °F. | Covered Tray Time Min. | Open Tray Temp. °F. | Open Tray Time Min. | Open Tray Temp. °F. | Open Tray Time Min. | Brightness of Cal. Clay, % |
|---|---|---|---|---|---|---|---|
| 0 | — | 0 | 750 | 20 | 1850 | 20 | 84.8 |
| 0 | 750 | 20 | — | 0 | 1850 | 20 | 84.9 |
| 1 | 750 | 20 | — | 0 | 1850 | 20 | 85.1 |
| 0 | — | 0 | 1250 | 20 | 1850 | 20 | 85.1 |
| 0 | 1250 | 20 | — | 0 | 1850 | 20 | 85.4 |
| 1 | 1250 | 20 | — | 0 | 1850 | 20 | 85.5 |
| 0 | — | 0 | 1450 | 20 | 1850 | 20 | 85.0 |
| 0 | 1450 | 20 | — | 0 | 1850 | 20 | 85.2 |
| 1 | 1450 | 20 | — | 0 | 1850 | 20 | 86.6 |
| 0 | — | 0 | 1650 | 20 | 1850 | 20 | 85.2 |
| 0 | 1650 | 20 | — | 0 | 1850 | 20 | 85.9 |
| 1 | 1650 | 20 | — | 0 | 1850 | 20 | 90.6 |
| 0 | — | 0 | 1850 | 20 | 1850 | 20 | 85.7 |
| 0 | 1850 | 20 | — | 0 | 1850 | 20 | 88.3 |
| 1 | 1850 | 20 | — | 0 | 1850 | 20 | 92.3 |

Data in Table II for the control test (all calcination in air at 1850°F. for 40 minutes) show that clay brightness was 85.7 percent. The data for the sample in which only native carbon impurity was present during an initial calcination under reducing conditions for the first 20 minutes of calcination at 1850°F. followed by 20 minutes calcination at 1850°F. in the presence of air show that clay brightness was 88.3 percent. Thus, the clay brightness was improved by 2.6 points by practice of the invention, utilizing the 1850°F. temperature to calcine under reducing conditions. When extra carbon was added under the same conditions, the product brightness was 92.3 percent. Thus, by incorporating additional carbon to the carbon contaminated clay, there was a further increase in brightness of 3.0 points. When the clay was calcined under reducing conditions at 1450°F. and 1650°F. before calcining at 1850°F. under oxidizing conditions, there was an increase in brightness for samples with and without added carbon as compared to results obtained when calcination at these temperatures was all carried out under oxidizing conditions. In both cases the addition of carbon further increased the brightness. On the other hand, when initial calcination under reducing conditions was carried out at 750°F. and 1250°F., there was no detectable benefit of using a reducing atmosphere even when additional carbon was added.

The results of these tests for the organic contaminated clay without added carbon clearly demonstrate that when access of air was prevented during the initial calcination, the resulting brightnesses were significantly higher provided calcination without access to air was at temperatures above 1400°F. Apparently the small amount of organic matter present in the gray clay produced an atmosphere sufficiently reducing in nature to result in higher brightness. The results for tests using additional carbon, 1 percent of the dry clay weight, resulted in still higher brightness but was of benefit only when calcination in the reducing atmosphere was above 1400°F.

EXAMPLE III

The procedures of Example II were carried out with other samples of fluid energy milled gray Georgia kaolin clay at temperature levels ranging from 1600°F. to 2200°F. under different conditions. The results are shown in the accompanying figure. The data clearly show that when access of air was prevented during the first half of the calcination at all temperatures in the range of 1800°F. to 2100°F., the clay brightness was significantly higher. Also shown is that the use of additional carbon resulted in still higher brightnesses. At a temperature of 2000°F., restricting access of air resulted in a 1.5 point brightness increase. A 3 point improvement was obtained when carbon was added to the sample. Conversely, to achieve a 90.0 percent brightness under conventional conditions it was necessary to use a calcination temperature close to 2000°F. This same brightness could be achieved while reducing the temperature by approximately 75°F. using the natural carbon impurity alone. On the other hand, the data indicate that the 90.0 percent brightness could be achieved while reducing temperature by about 400°F. when extra carbon was added. Maximum brightness for this particular clay did not appear to be affected by calcining conditions.

EXAMPLE IV

Experiments similar to those of the previous example were carried out with other samples of fluid energy milled gray kaolin. Brightness and Valley Abrasion were measured. The results showed that if the sample were calcined to a brightness of 90.6 percent by the conventional technique, a temperature of 2050°F. was necessary and Valley abrasion of the calcined pigment product was above 60 mg. On the other hand, when the clay was calcined with added carbon in a reducing atmosphere and then in air, in accordance with the invention, a similar brightness (90.4 percent) was achieved at a calcination temperature of only 1650°F. and Valley abrasion was only 22 mg. Using the 2050°F. calcination temperature required when conventional calcination was carried out, practice of my invention resulted in a clay that was 1.7 points brighter at a similar abrasiveness.

I claim:

1. A method for producing a calcined kaolin clay pigment which comprises heating finely divided particles of hydrated crystalline kaolin clay in a calciner under a reducing atmosphere to a temperature in the range of about 1400°F. to 2200°F., the time and temperature of heating being sufficient to dehydrate the particles of said clay withou sintering them, and thereafter heating the clay in a calciner in the presence of sufficient air to provide an oxidizing atmosphere to a temperature at least as high as the temperature to which said clay particles were heated under the reducing atmosphere and below the temperature at which sintering takes place, the temperature and time for heating in the oxidizing atmosphere being sufficient to result in a calcined clay pigment product that is brighter than the original hydrated clay and is also brighter than the calcined clay would be if all of the heating had been carried out under the oxidizing atmosphere at the temperature used when heating under the oxidizing atmosphere.

2. The method of claim 1 wherein said clay is heated under said reducing atmosphere and under said oxidizing atmosphere to temperatures below 2200°F.

3. The method of claim 1 wherein the clay is heated under the reducing and oxidizing atmosphere to temperatures in the range of 1600°F. to 2100°F.

4. A method for producing a calcined kaolin clay pigment which comprises heating finely divided particles of hydrated crystalline kaolin containing carbon in a calciner to a temperature in the range of 1400°F. to 2000°F. in the presence of air limited in amount to provide a reducing atmosphere for from 10 to 60 minutes and thereafter heating the clay in a calciner in the presence of sufficient air to oxidize carbon and provide an oxidizing atmosphere to a temperature which is at least as high as the temperature to which the clay was heated under the reducing atmosphere and below 2200°F. for from 10 to 60 minutes, the temperature and time for heating in the oxidizing atmosphere being sufficient to produce a calcined clay pigment that is brighter than the hydrated clay and is also brighter than the calcined clay pigment that would be obtained by carrying out all of the heating in the oxidizing atmosphere at the temperature used in heating the clay in the oxidizing atmosphere.

5. The method of claim 4 wherein said clay is heated under said reducing atmosphere and said oxidizing atmosphere to temperatures in the range of 1600°F. to 2100°F.

6. The method of claim 4 wherein at least a portion of the carbon is present as an impurity in the clay.

7. The method of claim 4 wherein at least a portion of the carbon is present as an additive with the hydrated kaolin clay prior to heating said clay under the reducing atmosphere, the amount of carbon added being in amount in the range of 0.1 percent to 5 percent of the weight of the clay.

8. A method for producing a high brightness calcined clay pigment from finely divided hydrated kaolin clay containing a small amount of a ferruginous impurity and less than 0.1 percent carbon as an impurity which comprises adding to said clay a source of carbon in amount of at least 0.1 percent by weight of the dry clay weight, heating the clay containing the added carbon to a temperature in the range of 1400°F. to 2000°F. for 10 to 60 minutes while maintaining the clay under a reducing atmosphere, and then calcining the clay for from 10 to 60 minutes in an oxidizing atmosphere to a temperature in the range of 1600°F. to 2200°F., thereby producing a calcined clay pigment having a brightness of at least about 90 percent, said calcined clay being brighter than the original hydrated clay and also being brighter than the calcined clay would be if all of the heating had been carried out under the oxidizing atmosphere at the temperature used when heating under the oxidizing atmosphere.

9. The method of claim 8 wherein the source of carbon is charcoal.

10. The method of claim 8 wherein the source of carbon is coal.

11. The method of claim 8 which is carried out by calcining the clay containing added carbon in a closed vessel to provide an atmosphere containing insufficient oxygen to burn completely the carbon and thereafter the clay is calcined in an open vessel.

* * * * *

UNITED STATES PATENT AND TRADEMARK OFFICE
CERTIFICATE OF CORRECTION

PATENT NO. : 3,941,872
DATED : March 2, 1976
INVENTOR(S) : Victor Puskar

It is certified that error appears in the above-identified patent and that said Letters Patent are hereby corrected as shown below:

Column 1 - line 66 - should read "temperature. Thus, it would be desirable to calcine a clay at".

Column 2 - line 23 - should read "tilizing iron impurities as the chlorides at elevated --; line 40 - should read "the clay is initially heated in a calciner under a reducing atmosphere".

Signed and Sealed this first Day of June 1976

[SEAL]

Attest:

RUTH C. MASON
Attesting Officer

C. MARSHALL DANN
Commissioner of Patents and Trademarks